(12) United States Patent
Schultz

(10) Patent No.: US 7,281,744 B1
(45) Date of Patent: Oct. 16, 2007

(54) CONVERTIBLE PICKUP CANOPY

(76) Inventor: John Gregory Schultz, 405 Newport Way NW., Issaquah, WA (US) 98027

( * ) Notice: Subject to any disclaimer, the term of this patent is extended or adjusted under 35 U.S.C. 154(b) by 0 days.

(21) Appl. No.: 11/493,064

(22) Filed: Jul. 26, 2006

(51) Int. Cl.
*B60P 3/00* (2006.01)

(52) U.S. Cl. ............... 296/26.07; 296/181.7; 296/100.1

(58) Field of Classification Search ............ 296/26.04, 296/26.06, 26.07, 181.7, 100.01, 100.02, 296/100.06, 100.09, 100.1
See application file for complete search history.

(56) References Cited

U.S. PATENT DOCUMENTS

| | | | |
|---|---|---|---|
| 4,807,924 A * | 2/1989 | Kottke | 296/26.06 |
| 5,102,185 A | 4/1992 | Lake | |
| 5,213,390 A | 5/1993 | Borchers | |
| 5,951,095 A * | 9/1999 | Herndon | 296/26.07 |
| 5,961,176 A * | 10/1999 | Tilly | 296/26.04 |
| 6,394,532 B1 | 5/2002 | Dence | |
| 6,428,079 B1 * | 8/2002 | Van Dyke | 296/100.06 |
| 6,616,210 B1 | 9/2003 | Massey | |
| 6,663,167 B2 * | 12/2003 | Phillips et al. | 296/100.1 |
| 6,712,418 B1 | 3/2004 | Lathers | |
| 6,820,915 B2 | 11/2004 | Mack et al. | |

* cited by examiner

*Primary Examiner*—Lori L. Lyjak
(74) *Attorney, Agent, or Firm*—Ryan Kromholz & Manion, S.C.

(57) ABSTRACT

A convertible pickup canopy is disclosed, the canopy having left and right sidewalls hingedly coupled with a frame member. The frame member is coupled with rails of the bed of a pickup truck, and allow the sidewalls and a rear door to expand to support a top cover, and to collapse to allow the top cover to travel in a lower profile.

5 Claims, 9 Drawing Sheets

CONVERTIBLE PICKUP CANOPY

BACKGROUND OF THE INVENTION

This invention relates to covers that enclose the bed area of a pickup truck. Tonneau covers are usually hard or soft covers that enclose bed of a pickup truck and protect that area from rain, snow and other weather elements.

SUMMARY OF THE INVENTION

The present invention is a pickup-truck bed cover which incorporates elements of both low-profile tonneau covers and solid-wall canopies. This convertible design transforms from several inches flat to a full height canopy in seconds— all while providing solid-wall, insulated security in either the expanded or collapsed position. In addition, the cover is designed to be safely driven down the road while either expanded or collapsed.

In the collapsed position, this cover provides outstanding driver visibility and a sleek low-profile appearance. It is preferably constructed of aluminum tread-plate, which provides a durable and attractive finish that compliments trucks of any color. Although the cover is only a few inches high in the collapsed position, in the expanded position it provides nearly four feet of interior height and cargo capacity superior to that of many fixed canopies.

There are five main components to the design: the frame, top cover, right sidewall, left sidewall and rear door. The sidewalls and rear door stow inside and under the top cover. The top cover pivots open which allows access to un-stow the rear door. The sides then pivot up to form the canopy. This design maintains the ability to store cargo below the bed sill height in either configuration, with access through the truck rear tailgate or canopy rear door.

The cover is generally rectangular in shape. It is several inches wider than the open bed of the pickup-truck. A preferably "U" shaped frame is affixed to the truck bed— along both sides and across the front of the bed. One half of a hinge rests along each of these three sides. The hinge along the forward edge of the frame attaches to the forward edge of the top cover and allows the cover to pivot open. Hinges along the left and right sides of the frame are attached to the left and right sidewall panels and allow each sidewall to pivot to a vertical position.

The left and right sides of the top cover have straight and level lower edges which are bent 90 degrees outward to rest on the upper edges of the truck bed. The top of the top cover is flat and level, parallel to the lower edges of the top cover sides. There is a slope at the front of the top cover beginning at the lower forward corner progressing upward and aft. This slope allows the cover to pivot open without intersecting the cab or rear window of the truck. The slope is of such an angle that it is generally vertical when the cover is in the expanded position.

On the aft portion of the top cover, there is another slope. This slope tapers from the upper surface of the top cover aft and downward to the rear edge of the cover. The slope is of such an angle that it is directly horizontal in the expanded position. This slope allows the aft portion of the cover to taper for better driver visibility and aerodynamics, yet provides a flat and level design element when expanded.

Two gas-filled lift struts are positioned inside the top cover. One end of each strut is attached near the forward side of the frame, and the other end is attached to the inner surface of the top cover side. These struts are located in such a position and geometry as to assist in raising open the cover and holding it up. The sidewalls are designed with the lift struts positioned between the inner panels of the sidewalls, and the sides of the top cover, which allows the lift struts to be hidden from view (from both the inside and the outside) when the sidewalls are expanded.

Attached to the upper surface of the top cover are two tiedown rails. These provide several hardpoints to secure oversize items carried on top of the cover. The bolts that attach these rails to the top cover also bolt through to the internal bracing in the roof of the top cover.

All components of this design overlap each other in both the expanded and collapsed positions to keep water out. A piece of flashing is located at the forward edge of each rail which prevents water from entering near the forward edge of the sides. Additional water intrusion is prevented by a series of seals. This overlapping component design, however, provide an inherent deterrent to leaks well beyond the dependence on seals.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
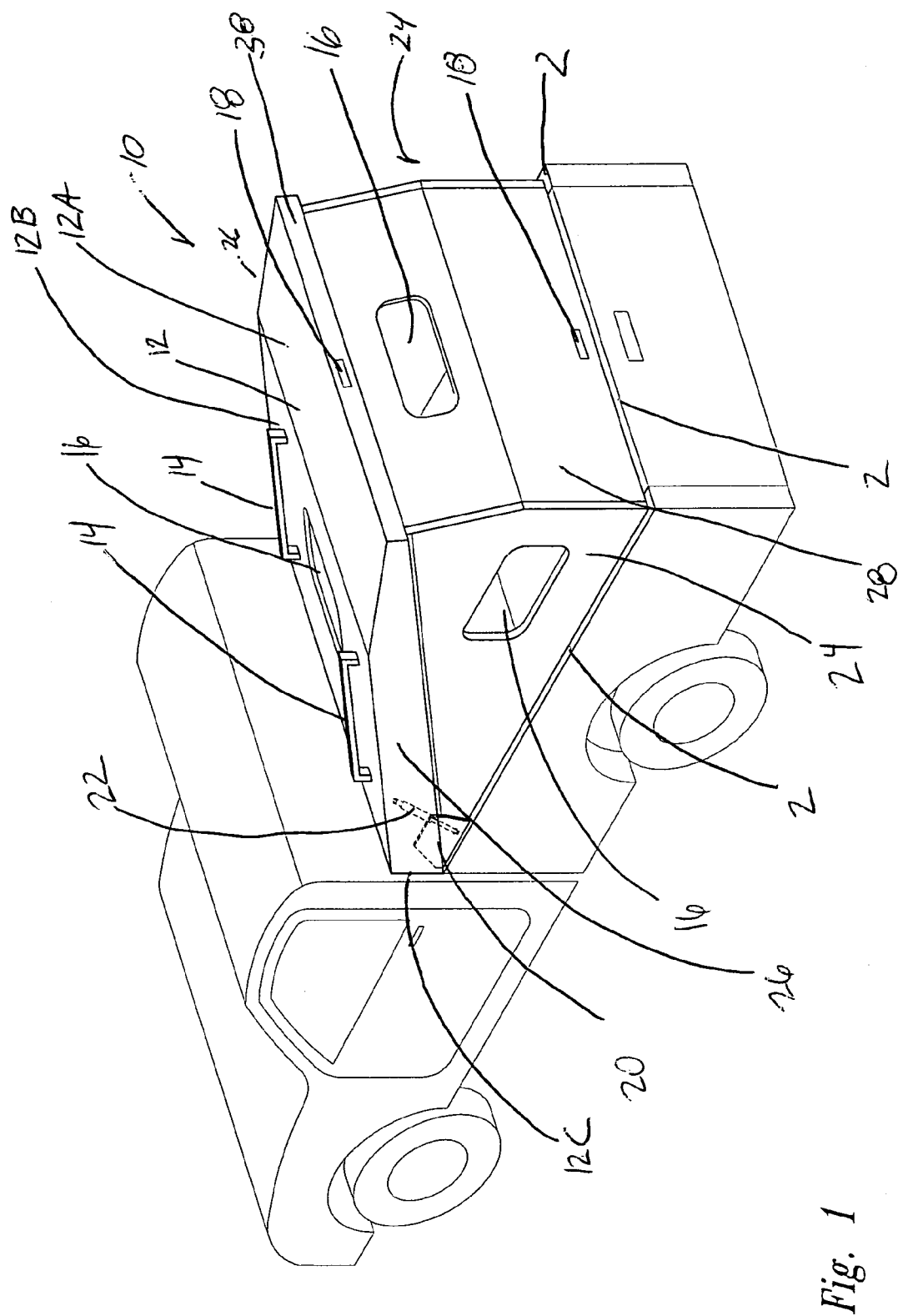
FIG. 1 is a rear perspective view of the convertible pickup canopy of the present invention, the convertible pickup canopy shown in an expanded condition and attached to a bed of a pickup truck.

Referring now to FIG. 1, is a rear perspective view of a convertible pickup canopy 10 of the present invention is shown, the convertible pickup canopy 10 shown in an expanded condition and attached to a bed of a pickup truck.

There are five main components to the design: the frame 11 (discussed with reference to FIG. 1A below), top cover 12, right sidewall 24, left sidewall 24 and rear door 28. The sidewalls 24 and rear door 28 stow inside and under the top cover 12 as will be described later. The top cover 12 pivots open which allows access to un-stow the rear door 28 as will be described later. The sides 24 then pivot up to form the canopy. This design maintains the ability to store cargo below the bed sill height in either configuration, with access through the truck rear tailgate or canopy rear door.

The top cover 12 is preferably equipped with tiedown rails 14. The tiedown rails 14 provide several hardpoints to secure oversize items carried on top of the cover. Bolts (not shown) attach tiedown rails 14 to the top cover 12.

A plurality of windows 16 are optionally provided on the top cover 12, and sidewalls 24. Handles 18 are also provided on various locations, preferably the rear door 28 and a rear portion 38 of the top cover 12 for movement, lifting or lowering of those parts.

Left and right sides 26 of the top cover 12 have preferably straight and level lower edges which are bent 90 degrees outward to rest on rails 2 of the truck bed. The top portion 12B of the top cover 12 is preferably flat and level, parallel to the lower edges of the top cover sides 26. There is preferably a slope 12C at the front of the top cover 12 beginning at the lower forward corner progressing upward and aft. This slope 12C allows the cover to pivot open without intersecting the cab or rear window of the truck. The slope 12C is preferably of such an angle that it is directly vertical when the cover 10 is in the expanded position.

On the aft portion of the top cover 12, there is another slope 12A. This slope 12A tapers from top portion 12B of the top cover 12 aft and downward to the rear edge of the cover 10. The slope 12A is of such an angle that it is preferably horizontal in the raised position. This slope 12A allows the aft portion of the cover to taper for better driver visibility and aerodynamics, yet provides a flat and level design element when raised.

Two preferably gas-filled lift struts 22 (only one is visible in FIG. 1) are positioned inside the top cover 12. One end of each strut 22 is attached near the forward side of the frame 11, and the other end is attached to inner surfaces of the top cover sides 26. These struts 22 are located in such a position and geometry as to assist in raising open the cover 10 and holding it up. The sidewalls 26 are designed with the lift struts 22 positioned between the inner panels of the sidewalls 26, and the sides of the top cover 12, which allows the lift struts 22 to be hidden from view (from both the inside and the outside) when the sidewalls 24 are raised.

Figure 1A:
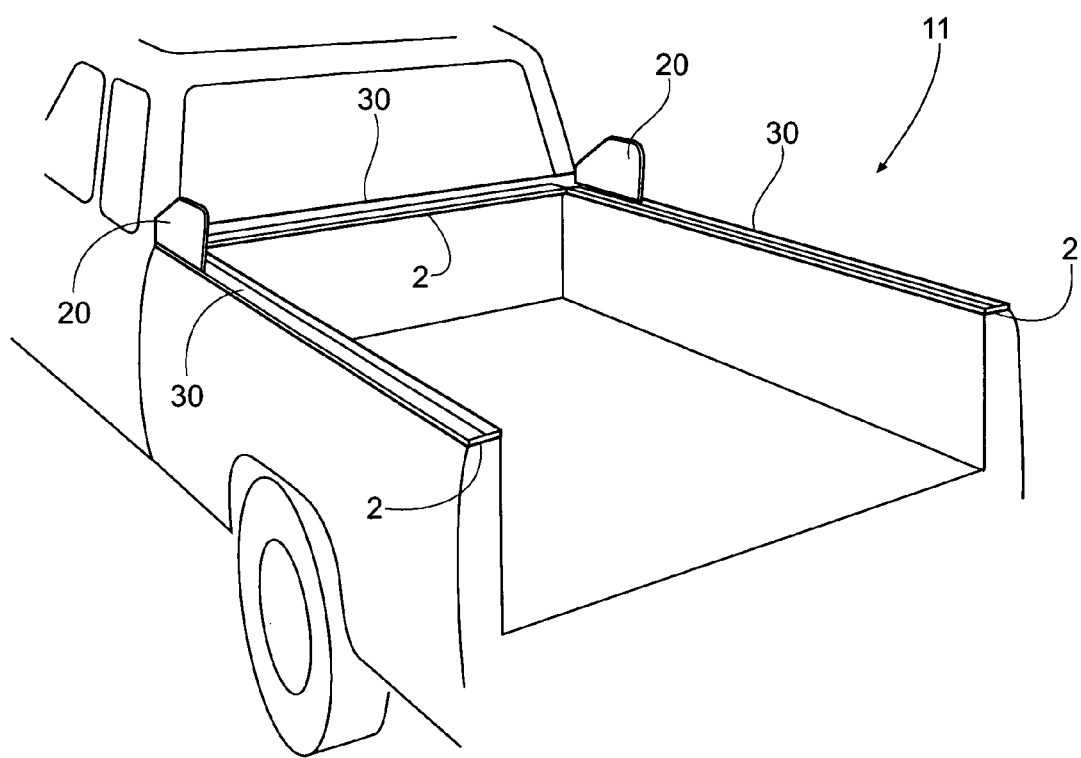
FIG. 1A is a rear perspective view of a frame of the convertible pickup canopy, the frame coupled to rails of a truck bed.

Referring now to FIG. 1A, a rear perspective view of the frame 11 of the convertible pickup canopy 10 is shown, the frame 11 coupled to rails 2 of a truck bed. The frame 11 is affixed to the truck bed—along both side rails 2 and across the front rail 2 of the bed. Half hinges 30 (an example shown in detail in FIG. 8) rest along each of the three sides of the frame 11. The hinge 30 along the forward edge of the frame attaches to the forward edge of the top cover 12 and allows the cover to pivot open. Hinges 30 along the left and right sides of the frame are attached to the left and right sidewall panels and allow each sidewall 24 to pivot to a vertical position for placing the cover 10 in its expanded condition. Flashings 20 are provided coupled to the frame 11 and providing a surface for struts 22 to affix to, and to prevent water from entering the truck bed near the forward edge of the frame 11.

Figure 2:
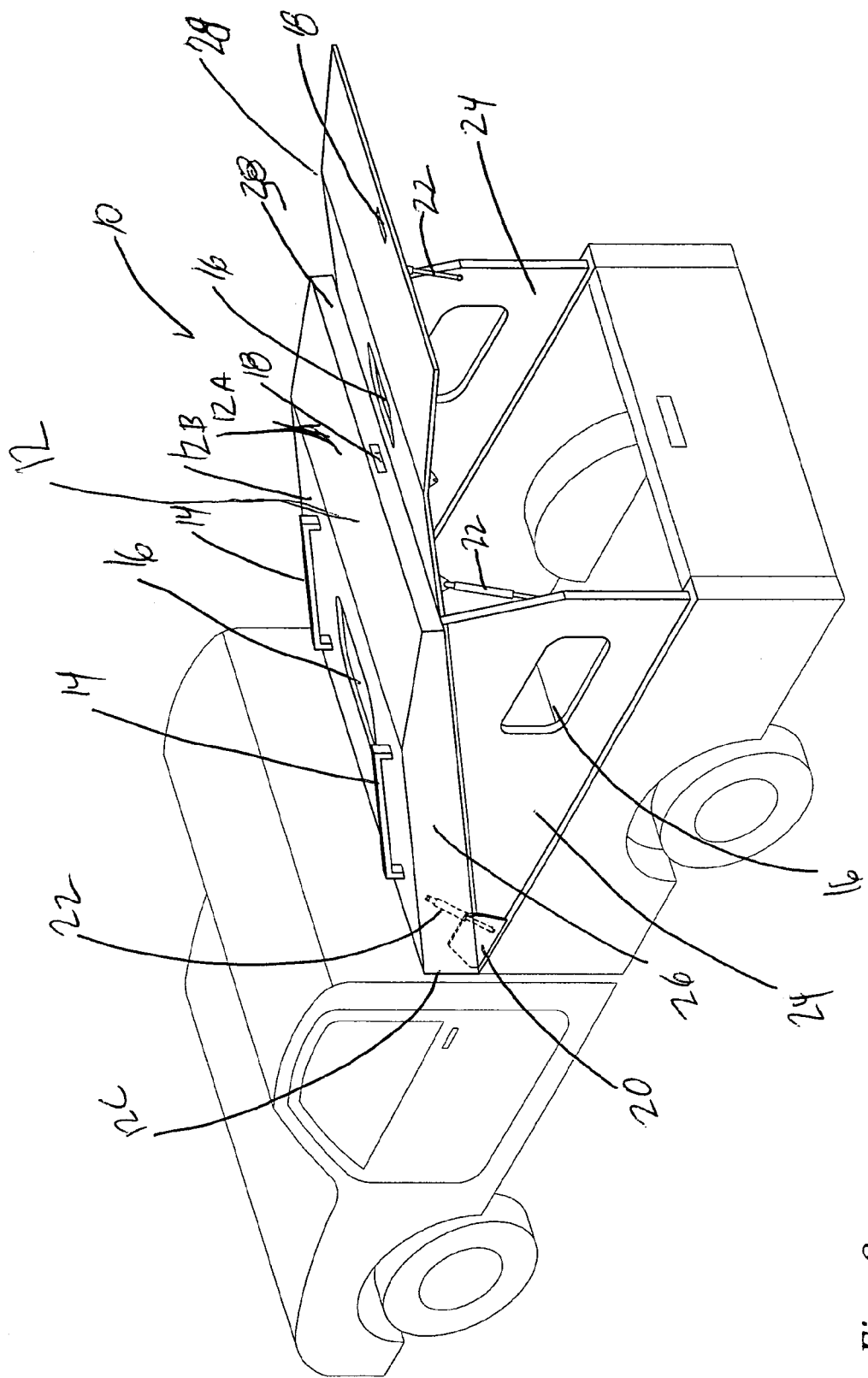
FIG. 2 is a rear perspective view of the convertible pickup canopy of the present invention, the convertible pickup canopy shown in an expanded condition, with a rear access door opened.

Referring now to FIG. 2, a rear perspective view of the convertible pickup canopy 10 of the present invention is shown, the convertible pickup canopy 10 shown in an expanded condition, with a rear access door 28 opened. As can be seen from this view, two additional struts 22 are coupled between the sidewalls 24 and a top portion of the rear access door 28, allowing and assisting the rear access door 28 to pivot and remain opened if desired. Preferably, the portion of the struts 22 that attach to the access door 28 are removably coupled with the sidewalls 24, to allow the canopy 10 to enter its collapsed condition, as will be described later.

FIGS. 3-7 demonstrate the conversion of the canopy 10 from its expanded to its collapsed condition.

Figure 3:
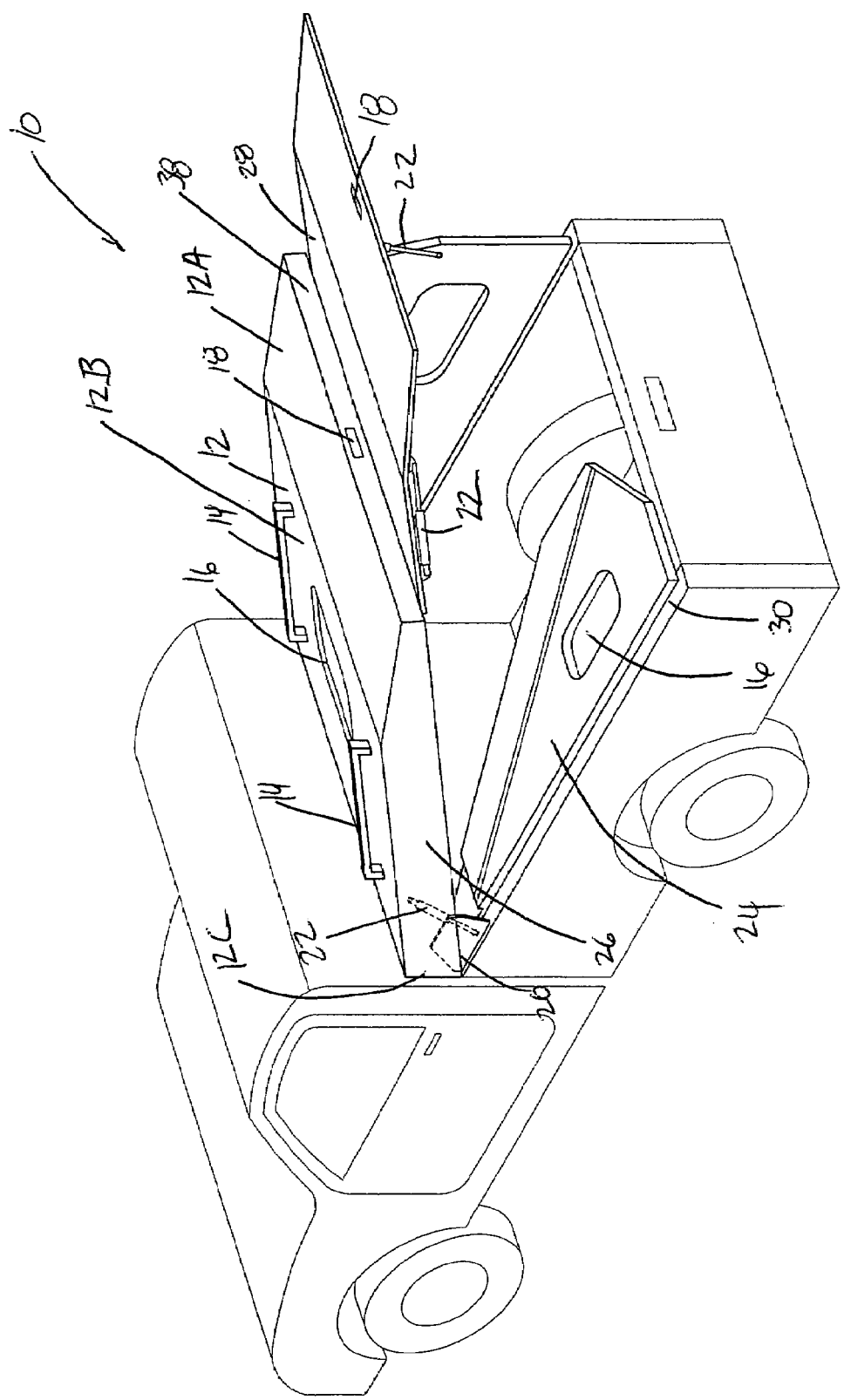
FIG. 3 is a rear perspective view of the convertible pickup canopy of the present invention, the convertible pickup canopy shown in an expanded condition, with a rear access door opened, and a left side panel collapsed.

Referring now to FIG. 3, a rear perspective view of the convertible pickup canopy 10 of the present invention is shown, the convertible pickup canopy 10 shown in an expanded condition, with the rear access door opened 28. It can be seen that the strut 22 attached to the left sidewall 24 has been detached from the left sidewall 24, allowing the left sidewall 24 to rotate about hinge 30 (example of hinge 30 shown in FIG. 8) into a substantially horizontal position hovering over the bed of the pickup truck.

From this view, it is evident that the sidewalls 24 are shaped complimentary along their top edge to the profile of the top cover 12, notably where the surfaces 12A and 12B of the top cover 12 are slanted. Similarly, the profile of the sidewalls 24 are shaped complimentary to the two-plane profile of the rear access panel 28. This allows for a tight fit and aids structural stability of the convertible pickup canopy 10.

Figure 4:
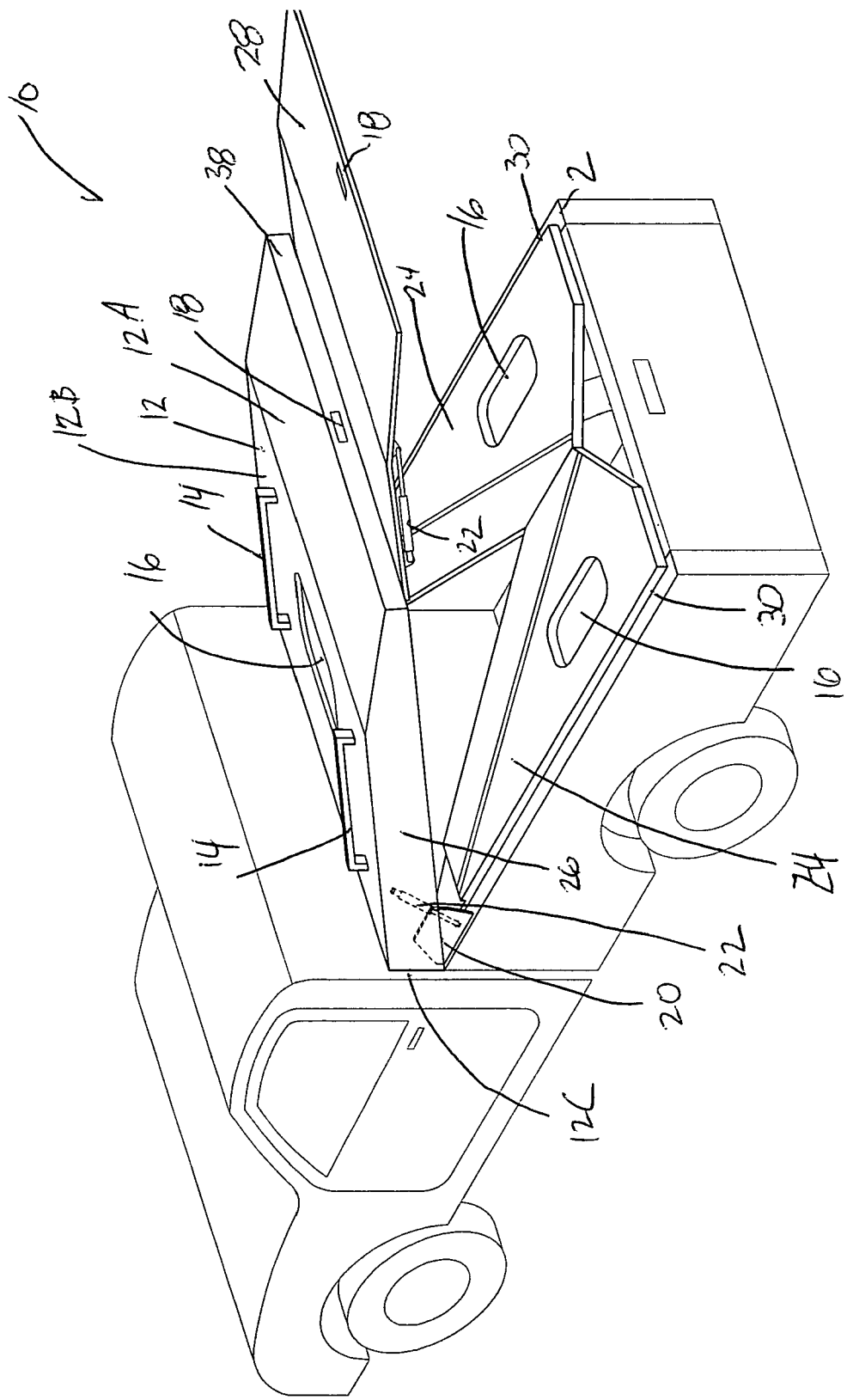
FIG. 4 is a rear perspective view of the convertible pickup canopy of the present invention, the convertible pickup canopy shown in an expanded condition, with a rear access door opened, and the left and a right side panel collapsed.

Referring now to FIG. 4 both the left and a right side panels have been collapsed by detaching struts 22 from the sidewalls 24. The sidewalls 24 now both lie in their collapsed condition over the bed of the truck.

Figure 5:
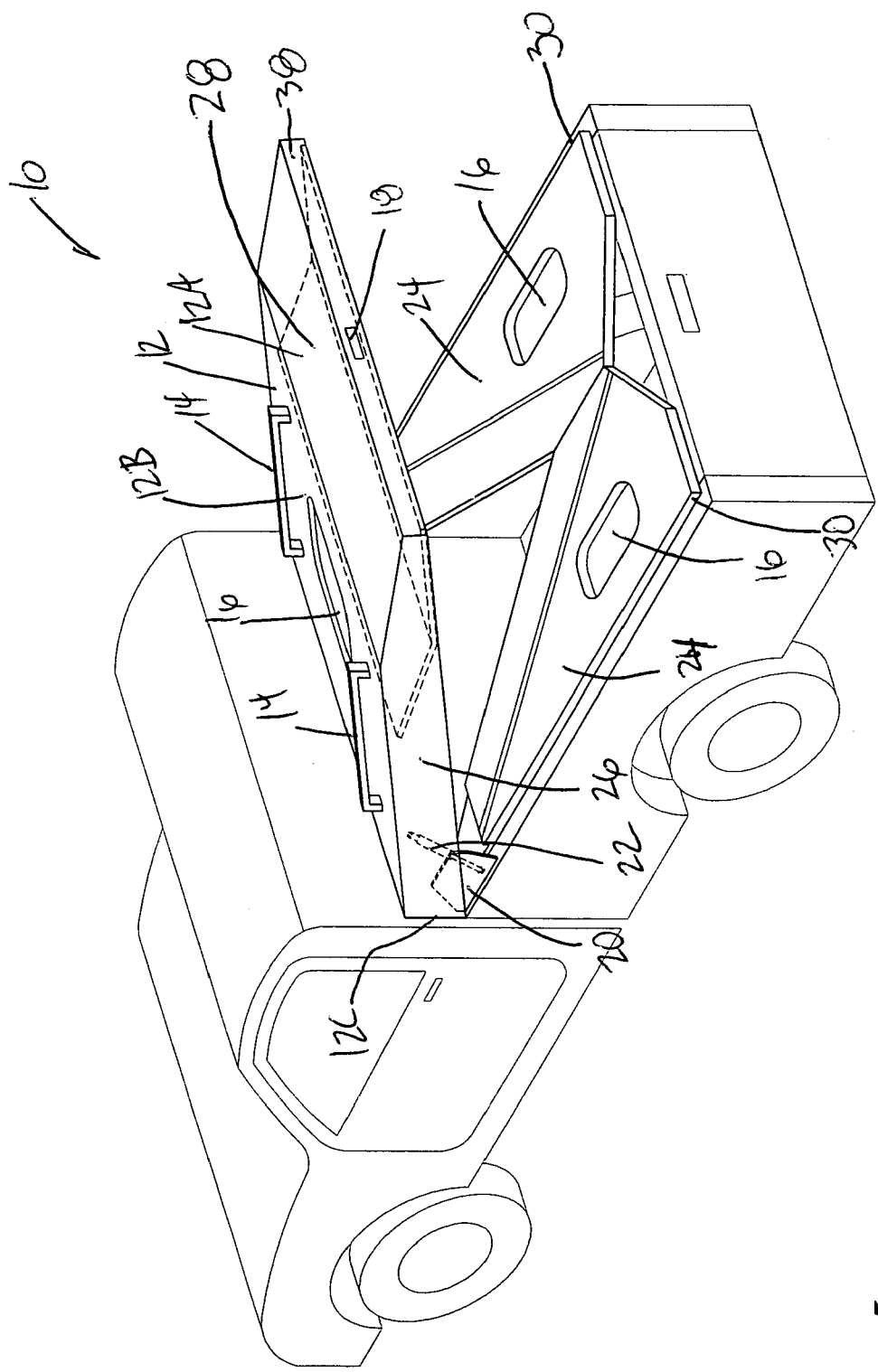
FIG. 5 is a rear perspective view of the convertible pickup canopy of the present invention, the convertible pickup canopy shown in an expanded condition, with a rear access door stowed, and the left and a right side panel collapsed.

Referring now to FIG. 5, the rear door 28 has been rotated about a hinge (not shown) and tucked under the top cover 12. It is noted also that the shape of the rear door 28 is complimentary with the profile of the top cover 12 such that when the top cover 12 becomes lowered, the rear door 28 will be sandwiched between the sidewalls 24, already lying in their substantially horizontal collapsed condition and the top cover 12.

Figure 6:
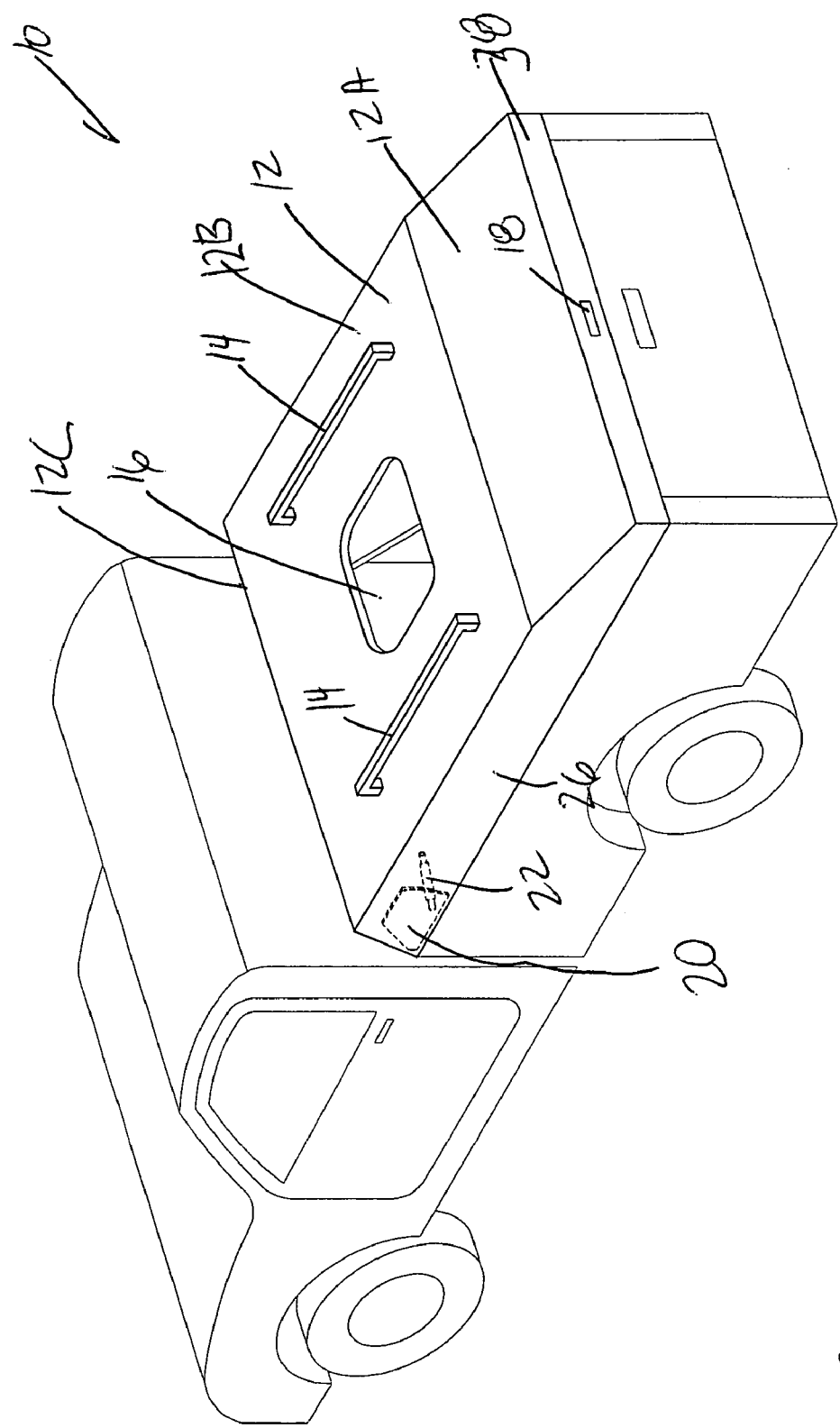
FIG. 6 is a rear perspective view of the convertible pickup canopy of the present invention, the convertible pickup canopy shown in a collapsed condition.

Referring now to FIG. 6, after collapsing the sidewalls 24 and the rear door 28, the top cover 12 can be pulled downward, rotating about struts 22 and placing the convertible pickup canopy 10 in its fully collapsed condition.

Figure 7:
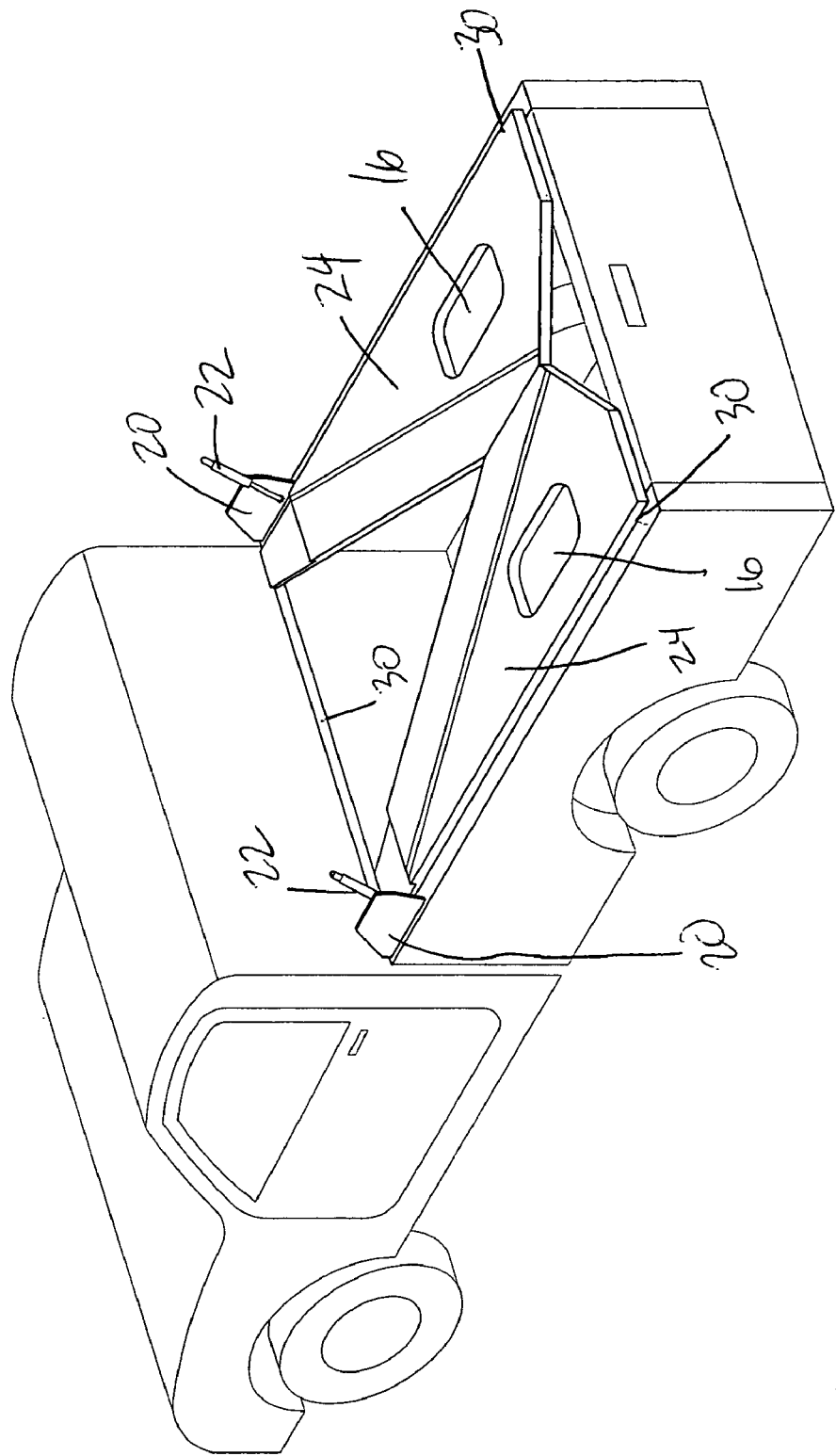
FIG. 7 is a rear perspective view of the convertible pickup canopy of the present invention, the convertible pickup canopy shown in a collapsed condition and the top cover removed.

Referring now to FIG. 7 is a rear perspective view of the convertible pickup canopy 10 of the present invention, the convertible pickup canopy 10 shown in a collapsed condition and the top cover removed. Latching mechanisms (such as shown in FIG. 8) can be provided to ensure that the top cover 12 remains collapsed when intended.

Figure 8:
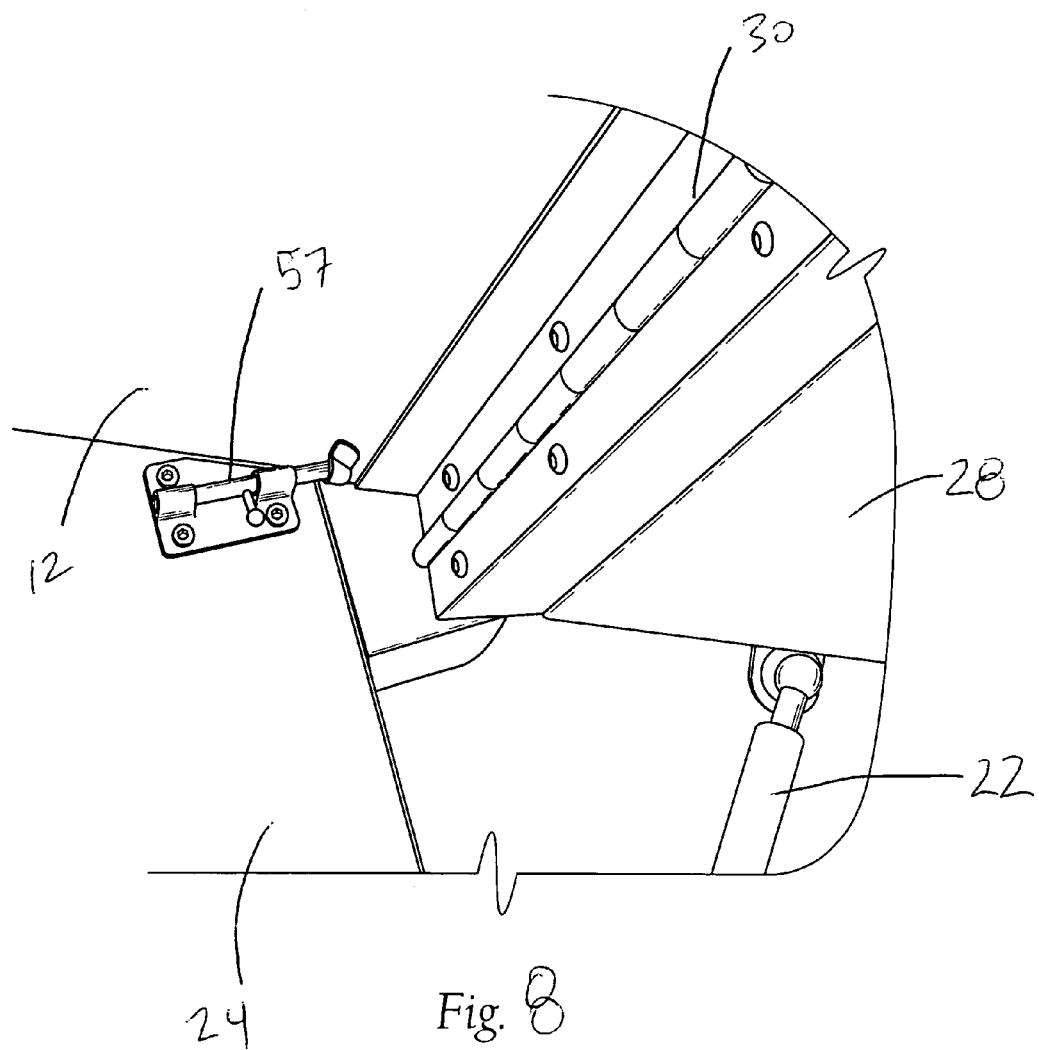
FIG. 8 is a perspective view of interior components of the convertible pickup canopy.

Referring now to FIG. 8 is a perspective view of interior components of the convertible pickup canopy 10. This view shows the canopy 10 in a position as in FIG. 2, with the canopy 10 in an expanded condition, with sidewall 24 shown vertical and top cover 12 secured thereto. A latch 57 is provided to secure sidewalls 24 with the top cover 12 with sidewall 24 in the expanded condition. The latch 57 is detached for placing the canopy 10 in the collapsed condition. Also shown is strut 22 which is coupled between rear door 28 and sidewall 24 as shown in FIG. 2. As can be seen, hinge 30 allows rear door 28 to pivot open as shown in FIG. 2.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A convertible pickup canopy comprising:

a left sidewall hingedly coupled with a frame member;

a right sidewall hingedly coupled with the frame member;

said frame member coupled to top rails of a bed of a pickup truck;

a strut coupled with said frame member;

a top cover rotatably coupled with said strut;

a rear door rotatably coupled with said top cover;

said left sidewall, said right sidewall, and said rear door supporting said top cover defining an expanded condition;

said left sidewall, said right sidewall, and said rear door being rotatably collapsible underneath said top cover relative to the bed of the pickup truck, defining a collapsed condition.

2. The convertible pickup canopy of claim 1, said canopy further comprising:

a tie down rail coupled to said top cover.

3. The convertible pickup canopy of claim 1, said canopy further comprising:

a window provided on said top cover.

4. The convertible pickup canopy of claim 1, said canopy further comprising:

a window provided on at least one of said sidewalls.

5. The convertible pickup canopy of claim 1, said canopy further comprising:

a tie down rail coupled to said top cover.

* * * * *